United States Patent [19]

Kim et al.

[11] Patent Number: 5,602,601
[45] Date of Patent: Feb. 11, 1997

[54] PHASE ERROR CORRECTOR FOR HDTV RECEPTION SYSTEM

[75] Inventors: Jong G. Kim; Kyeong S. Kim, both of Seoul; Su W. Jung, Kyungki-do, all of Rep. of Korea

[73] Assignee: L. G. Electronics Inc., Seoul, Rep. of Korea

[21] Appl. No.: 426,182

[22] Filed: Apr. 21, 1995

[51] Int. Cl.$^6$ .................................................. H04N 5/21
[52] U.S. Cl. ........................ 348/607; 348/726; 375/340; 375/346
[58] Field of Search .................................... 348/725, 726, 348/720, 471, 607; 375/346, 340, 344, 348, 349, 261, 254, 284, 285, 371, 375, 324, 235; H04N 5/21

[56] References Cited

U.S. PATENT DOCUMENTS

| | | | |
|---|---|---|---|
| 4,847,864 | 7/1989 | Cupo | 375/14 |
| 5,001,727 | 3/1991 | McDavid | 375/80 |
| 5,115,452 | 5/1992 | Cupo | 375/14 |
| 5,177,611 | 1/1993 | Gibson et al. | 358/167 |
| 5,406,587 | 4/1995 | Horwitz et al. | 375/346 |
| 5,479,449 | 12/1995 | Patel et al. | 375/316 |
| 5,533,070 | 7/1996 | Krishnamurthy et al. | 375/346 |
| 5,533,071 | 7/1996 | Krishnamurthy et al. | 375/346 |

Primary Examiner—Victor R. Kostak
Assistant Examiner—Chris Grant
Attorney, Agent, or Firm—Fish & Richardson P.C.

[57] ABSTRACT

A phase error corrector for an HDTV reception system, which can correct data level errors by reducing phase errors coming from local oscillators, includes a gain and offset adjustment unit for adjusting a gain and an offset of incoming I data, a Hilbert transform filter for performing a Hilbert transform filtering of the I data received from the gain and offset adjustment unit for generating Q data, a log LUT for producing logarithmic values of the I data and the Q data received from the gain and offset adjustment unit and the Hilbert transform filter into a logI value and a logQ value respectively, a complex multiplexer for generating a corrected I value and a corrected Q value having their errors corrected out of the logI value and the logQ value received from the log LUT, a phase error detector for detecting phase errors from the corrected I value and the corrected Q value received from the complex multiplexer, and a loop filter for accumulating phase errors received from the phase error detector and applying the accumulated phase errors to the complex multiplexer. The phase error detector advantageously can reduce slice errors caused by phase noise coming from the local oscillator used in a tuner by correcting phase errors, and can be applicable not only to an HDTV but also a QAM for correcting phase errors in an 8 VSB system.

21 Claims, 10 Drawing Sheets

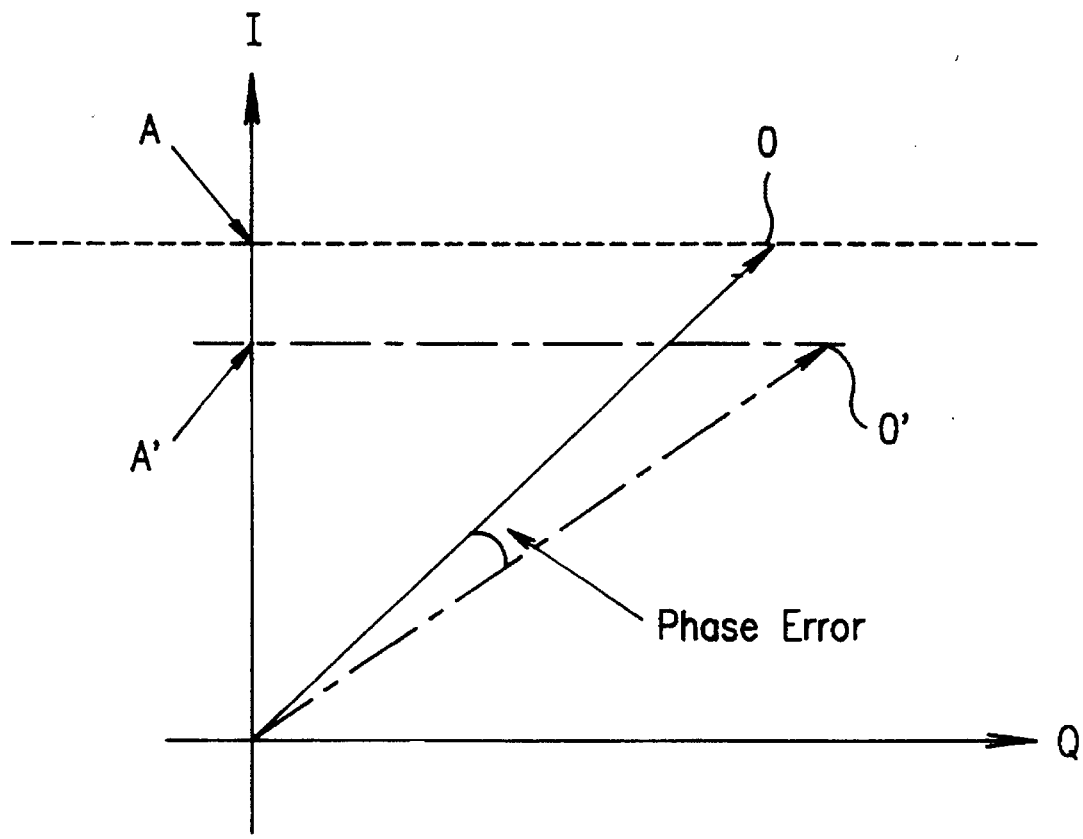

(1)

PHASE ERROR CORRECTOR FOR HDTV RECEPTION SYSTEM

BACKGROUND OF THE INVENTION

This invention relates to a phase error corrector for an HDTV reception system, which can correct data level errors by reducing phase noise coming from local oscillators.

FIG. 1 is a general HDTV reception system proposed by the Grand Alliance.

As shown in FIG. 1, in general, the HDTV reception system includes a tuner 1 for converting a RF signal received through an antenna into an IF signal, an IF filter and synchronous detector 2 for converting the IF signal received from the tuner 1 into a baseband signal and detecting synchronism from the baseband signal, a synchronous and timing detector 4 for detecting various clock signals and control signals from the baseband signal received from the IF filter and synchronous detector 2, an NTSC removing filter 3 for removing NTSC signals from the baseband signal received from the IF filter and synchronous detector 2, an equalizer 5 for correcting distorted signals received from the NTSC removing filter 3, a phase error corrector 6 for removing phase errors formed by local oscillators from the signals received from the equalizer 5, a slicer 7 for slicing the signals received from the phase error corrector 6 to obtain an original data level, a data deinterleaver 8 for deinterleaving the data received from the slicer 7, a Reed-Solomon decoder 9 for Reed-Solomon decoding of the data received from the data deinterleaver 8 for correcting errors, and a data de-randomizer 10 for de-randomizing the data received from the Reed-Solomon decoder 9 for restoring the signals de-randomized at a transmission side.

Herein, in general, the phase error corrector 6 removes phase errors mostly formed by a local oscillator used in the tuner 1, of which phase error is to be explained hereinafter in detail, referring to FIGS. 2 and 3.

FIG. 2 shows an 8 VSB(Vestigial Side Band) constellation, wherein the I value is actual data, and the Q value is, not discrete, but continuous, and varies depending on the I value.

In FIGS. 2 and 3, the reason that each of the horizontal lines of the I value has a certain thickness is due to white noise.

The 8 VSB constellation of FIG. 2 is distorted into a constellation as shown in FIG. 3 due to phase errors caused by local oscillators.

That is, as shown in FIG. 3, the phase errors, i.e., the errors due to phase noise projected normal to I axis becomes greater for the same I value as the Q value becomes greater, which is to be explained hereinafter, referring to FIG. 4.

FIG. 4 is an enlargement of K part of FIG. 3 showing data level errors caused by phase noise.

For example, in case an original data position is "0", and if the data position is moved to "0'" due to a phase error, although the I value of the original "0" projected normal to I axis is "A" an actual I value of the original "0" projected normal to I axis moves to "A'" due to the phase error. Therefore, the I axis component error "A" from "A'" which causes a data level error when it is sliced at the slicer 7, causes a slice error. Herein, an angle between the original data position "0" and actual data position "0'" by the phase error is a phase error caused by phase noise.

SUMMARY OF THE INVENTION

The object of this invention is to provide a phase error corrector for an HDTV reception system, which can correct data level error by reducing phase noise coming from a local oscillator of a tuner.

These and other objects and features of this invention can be achieved by providing a phase error corrector for an HDTV reception system, including a gain and offset adjustment unit for adjusting a gain and an offset of incoming I data, a Hilbert transform filter for performing a Hilbert transform filtering of the I data received from the gain and offset adjustment unit for generating Q data, a log LUT for producing logarithmic values of the I data and the Q data received from the gain and offset adjustment unit and the Hilbert transform filter into logI value and logQ value respectively, a complex multiplexer for generating a corrected I value and a corrected Q value having their errors corrected out of the logI value and the logQ value received from the log LUT, a phase error detector for detecting phase errors from the corrected I value and the corrected Q value received from the complex multiplexer, and a loop filter for accumulating phase errors received from the phase error detector and applying the accumulated phase errors to the complex multiplexer.

BRIEF DESCRIPTION OF THE DRAWINGS

FIG. 4 shows a data level error caused by the phase noise of FIG. 3.

DETAILED DESCRIPTION OF THE PREFERRED EMBODIMENTS

Figure 5:
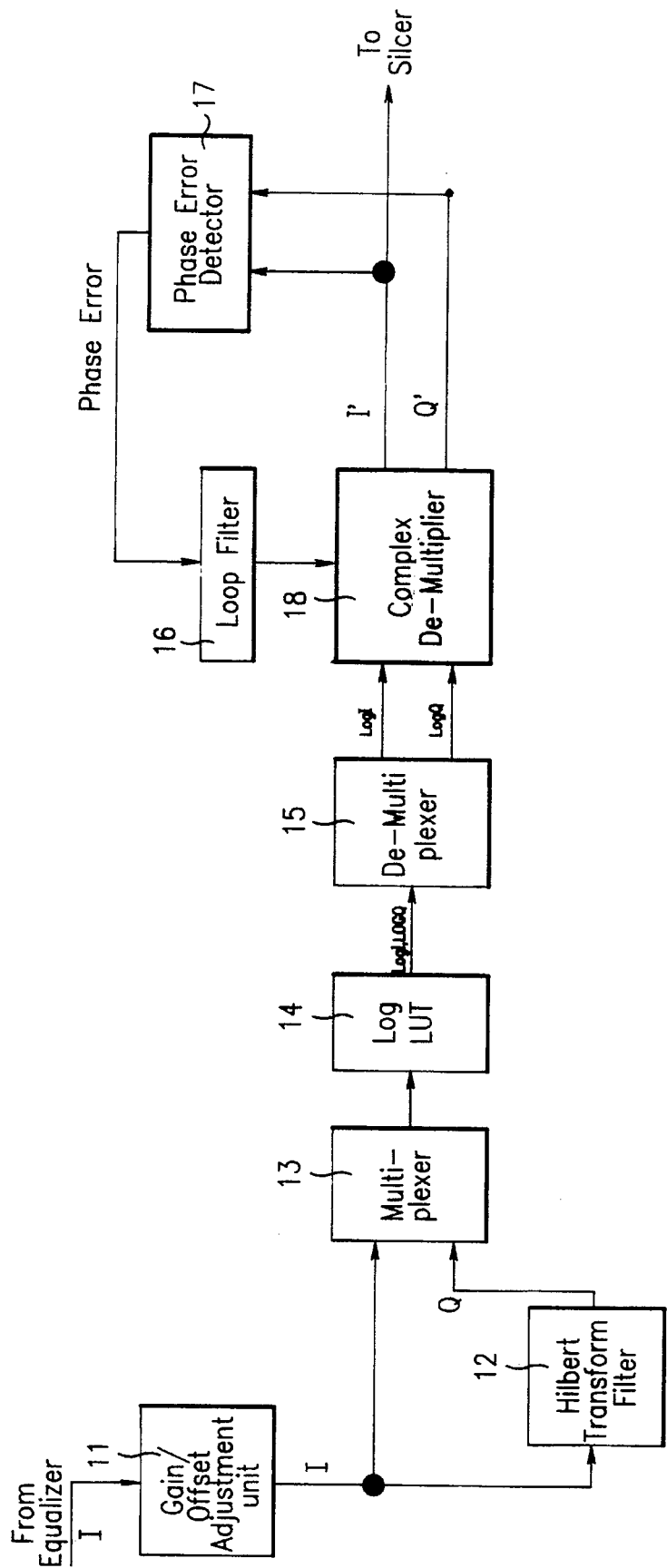
FIG. 5 is a system of a phase error corrector in accordance with this invention.

As shown in FIG. 5, a first embodiment of a phase error corrector for an HDTV reception system in accordance with this invention includes a gain/offset adjustment unit 11, a Hilbert transform filter 12, a multiplexer 13, a log LUT (Look Up Table) 14, a demultiplexer 15, a complex demultiplexer 18, a phase error detector 17, and a loop filter 16.

The gain/offset adjustment unit 11 adjusts a gain and an offset of received data.

The Hilbert transform filter 12 performs a Hilbert transform filtering of the I data received from the gain/offset adjustment unit 11 for generating Q data.

The multiplexer 13 multiplexes the I data and the Q data received both from the gain/offset adjustment unit 11 and the Hilbert transform filter 12 respectively and applies them to the log LUT 14.

The log LUT 14 produces logarithmic values of the I value and the Q value received from both the gain/offset adjustment unit 11 and the Hilbert transform filter 12 respectively having been multiplexed at the multiplexer 13.

The demultiplexer 15 demultiplexes the logI value and the logQ value received from the log LUT 14 and applies them to the complex demultiplexer 18.

The complex demultiplexer 18 produces a phase error corrected I value I' and a phase error corrected Q value Q' using the logI value and the logQ value received from the log LUT 14 having been demultiplexed through the demultiplexer 15, and applies them to a slicer.

The phase error detector 17 detects phase errors from the corrected I value I' and the corrected Q value Q' received from the complex demultiplexer 18.

The loop filter 16 accumulates the phase errors received from the phase error detector 17 and applies them to the complex demultiplexer 18.

Operation of the first embodiment of the phase error corrector having the foregoing system is to be explained hereinafter.

Figure 1:
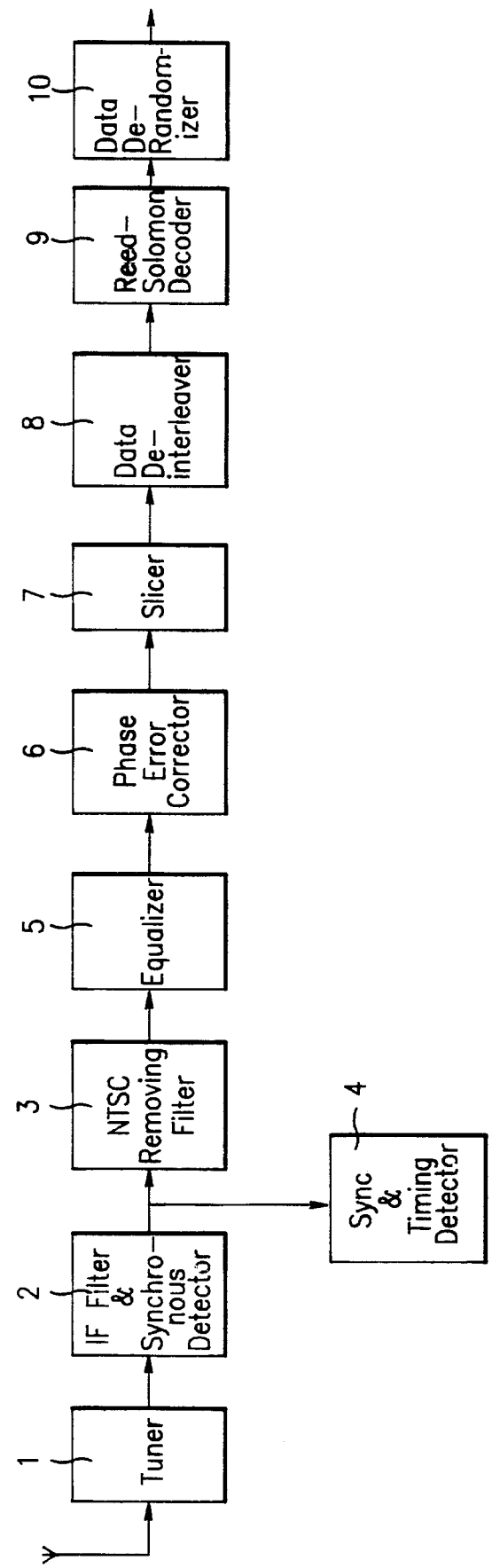
FIG. 1 is a general HDTV reception system.

The I data received from the equalizer of the HDTV reception system of FIG. 1, having the gain and the offset corrected at the gain/offset adjustment unit 11, is caused to generate the Q data by the Hilbert transform filter 12.

The I data I and the Q data Q applied from the gain/offset adjustment unit 11 and the Hilbert transform filter 12 respectively are, passed through the multiplexer 13, caused to produce their respective logarithmic values of logI value and logQ value at the log LUT 14, demultiplexed through the demultiplexer 15, and applied to the complex demultiplexer 18.

The complex demultiplexer 18 applies the corrected I value I' and the corrected Q value Q' having been corrected of their respective phase error received from the loop filter 16 to the slicer.

That is, the complex demultiplexer 18, by performing a computation of the following equation 1, produces the corrected I value I' and the corrected Q value Q'.

Equation 1

$$I'=I \cos\theta - Q \sin\theta$$

$$Q'=I \sin\theta + Q \cos\theta$$

Wherein the θ is an output of the loop filter.

The corrected I value I' and the corrected Q value Q' from the complex demultiplexer 18 are applied to the phase error detector 17, to produce a phase error, i.e., an angular error.

Figure 3:
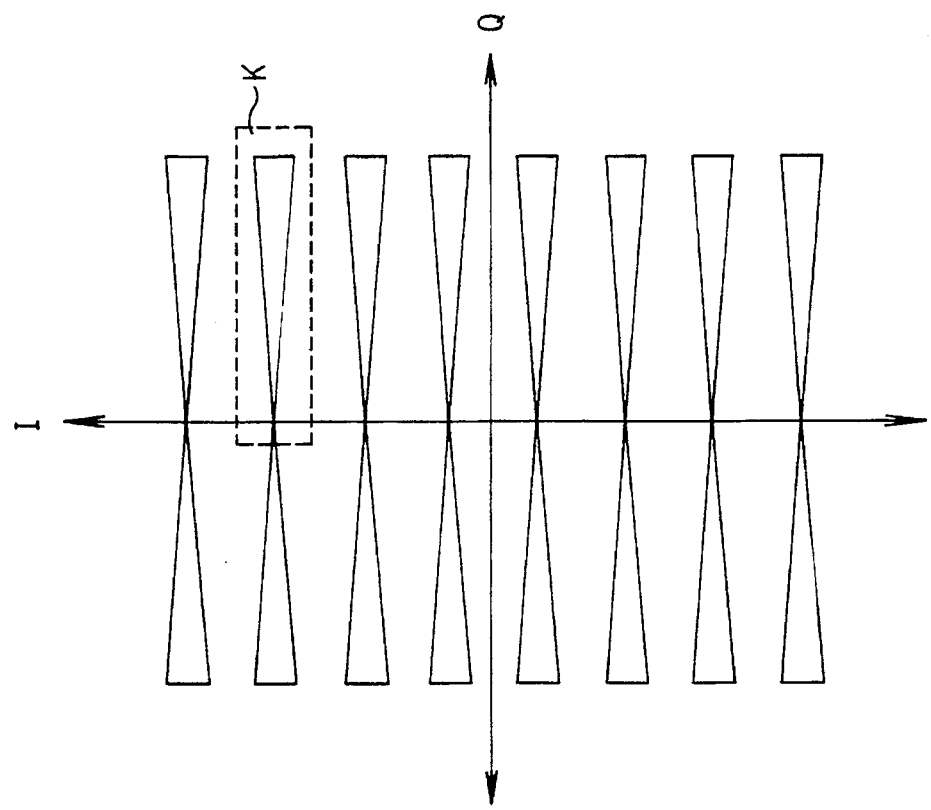
FIG. 3 shows the 8 VSB constellation of FIG. 2 due to phase errors.
Figure 2:
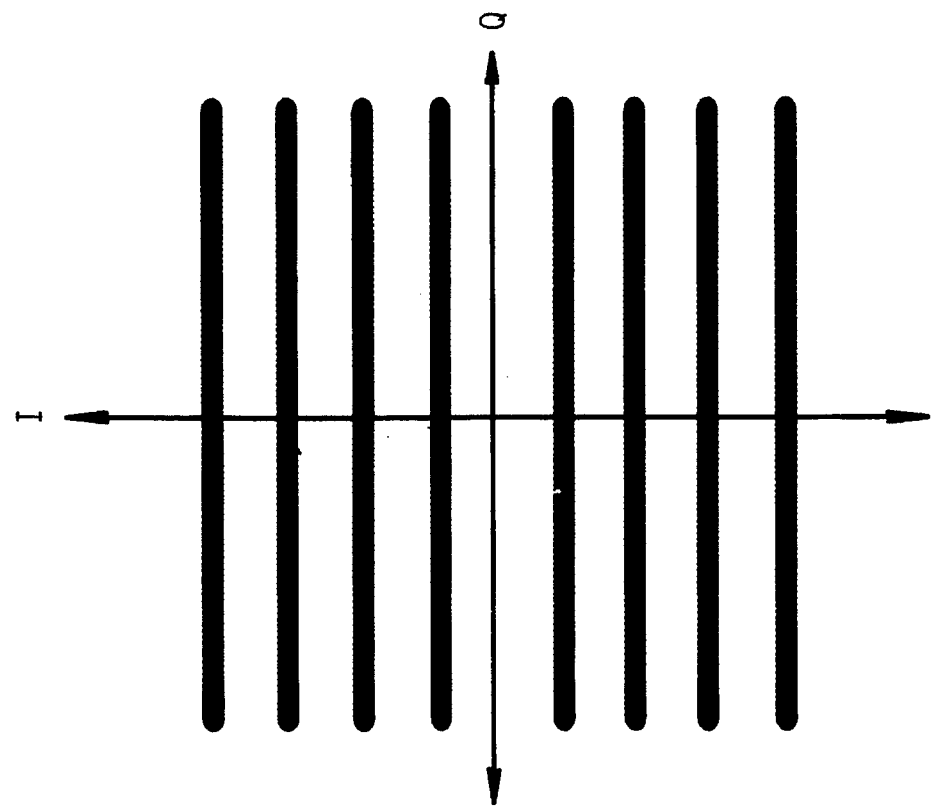
FIG. 2 shows an 8 VSB constellation.

As shown in FIG. 3, of the phase errors applied from the phase error detector 17 to the loop filter 16, the error on I axis becomes smaller when Q value is small, and the error on I axis becomes greater when Q value is great.

Therefore, by accumulating the phase errors received from the phase error detector 17 at the loop filter 16, the phase errors can be corrected.

That is, as shown in FIG. 3, the phase errors can be corrected with the accumulated phase errors, i.e., with the accumulated angular errors at the loop filter 16, even in case the Q value is great.

The accumulated phase errors applied from the loop filter 16 to the complex demultiplexer 18 are used for correcting the I value and the Q value, and the final outputs of the corrected I value I' and the corrected Q value Q' from the phase error detector 17 are applied to the slicer.

Figure 6:
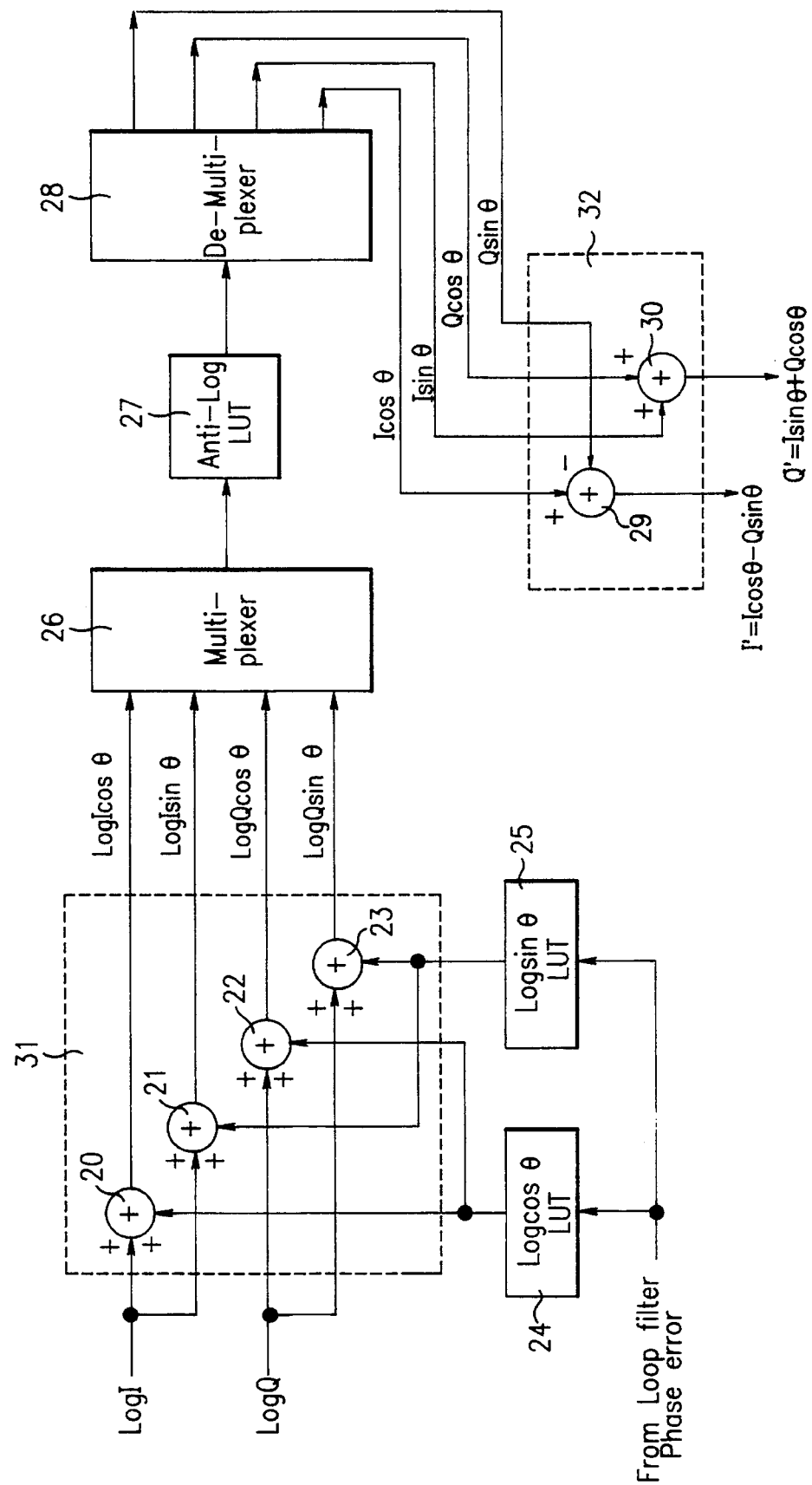
FIG. 6 is a system detail of the complex multiplexer of FIG. 5.

Referring to FIG. 6, a system detail of the complex demultiplexer 18 of FIG. 5 is to be explained hereinafter.

As shown in FIG. 6, the complex demultiplexer 18 includes a logcosθ LUT 24 for producing a logarithmic cosine of the phase error θ received from the loop filter 16 into logcosθ, a logsinθ LUT 25 for producing a logarithmic sine of the phase error 8 received from the loop filter 16 into logsinθ, an adding part 31 for adding the logI value and the logQ value received from the log LUT 14 through the demultiplexer 15 to the logcosθ and the logsinθ received from the logcosθ LUT 24 and the logsinθ LUT 25 respectively, a multiplexer 26 for multiplexing the data received from the adding part 31, an anti-log LUT 27 for producing an anti-logarithmic value for each of the data values received from the multiplexer 26, a demultiplexer 28 for demultiplexing the data values received from the anti-log LUT 27, and a computing part 32 for subtracting and adding the data values(I cosθ, I sinθ, Q cosθ, and Q sinθ) received from the demultiplexer 28 for producing a phase error corrected I value I' and a phase error corrected Q value Q'.

Herein, the adding part 31 includes an adder 20 for adding the logI value received from the log LUT 14 through the demultiplexer 15 and the logcosθ received from the logcosθ LUT 24, an adder 21 for adding the logI value received from the log LUT 14 through the demultiplexer 15 and the logsinθ received from the logsinθ LUT 25, an adder 22 for adding the logQ value received from the log LUT 14 through the demultiplexer 15 and the logcosθ received from the logcosθ LUT 24, and an adder 23 for adding the logQ value received from the log LUT 14 through the demultiplexer 15 and the logsinθ received from the logsinθ LUT 25.

The computing part 32 includes a subtracter 29 for subtracting Qsinθ from Icosθ received from the demultiplexer 28 for producing a phase error corrected I value I', and an adder 30 for adding Qcosθ to Isinθ received from the demultiplexer 28 for producing a phase error corrected Q value Q'.

Operation of the complex demultiplexer 18 for computing the equation 1 is to be explained hereinafter.

A phase error from the loop filter 16 is converted into a logcosθ and a logsinθ through the logcosθ LUT 24 and the logsinθ LUT 25, respectively.

The logcosθ and the logsinθ, converted through the logcosθ LUT 24 and the logsinθ LUT 25 respectively, are added to the logI value and the logQ value applied from the demultiplexer 15 through the adders 20, 21, 22, and 23 respectively, to produce logIcosθ, logIsinθ, logQcosθ, and logQsinθ.

That is, the logI value applied from the log LUT 14 through the demultiplexer 15 and the logcosθ applied from the logcosθ LUT 24 are added at the adder 20 into logIcosθ, the logI value applied from the log LUT 14 through the demultiplexer 15 and the logsinθ applied from the logsinθ LUT 25 are added at the adder 21 into logIsinθ, the logQ value applied from the log LUT 14 through the demultiplexer 15 and the logcosθ applied from the logcosθ LUT 24 are added at the adder 22 into logQcosθ, and the logQ value applied from the log LUT 14 through the demultiplexer 15 and the logsinθ applied from the logsinθ LUT 25 are added at the adder 23 into logQsinθ.

The logIcosθ, logIsinθ, logQcosθ, and logQsinθ applied from the adding part 31 are, multiplexed at the multiplexer 26, and anti-logged at the anti-log LUT 27 into Icosθ, Isinθ, Qcosθ, and Qsinθ.

The Icosθ, Isinθ, Qcosθ, and Qsinθ applied from the anti-log LUT 27 are, demultiplexed at the demultiplexer 28, and computed at the computing part 32 into the phase error corrected I value I' and the phase error corrected Q value Q'.

That is, the Icosθ, subtracted of Qsinθ at the subtracter 29, is produced into the phase error corrected I value I' and the Isinθ, added to Qcosθ at the adder 30, is produced into the phase error corrected Q value Q'.

In other words, the finally corrected I value I' and Q value Q' can be obtained at the subtracter 29 and the adder 30 respectively according to the phase error applied from the loop filter 16 based on equation 1.

Figure 7:
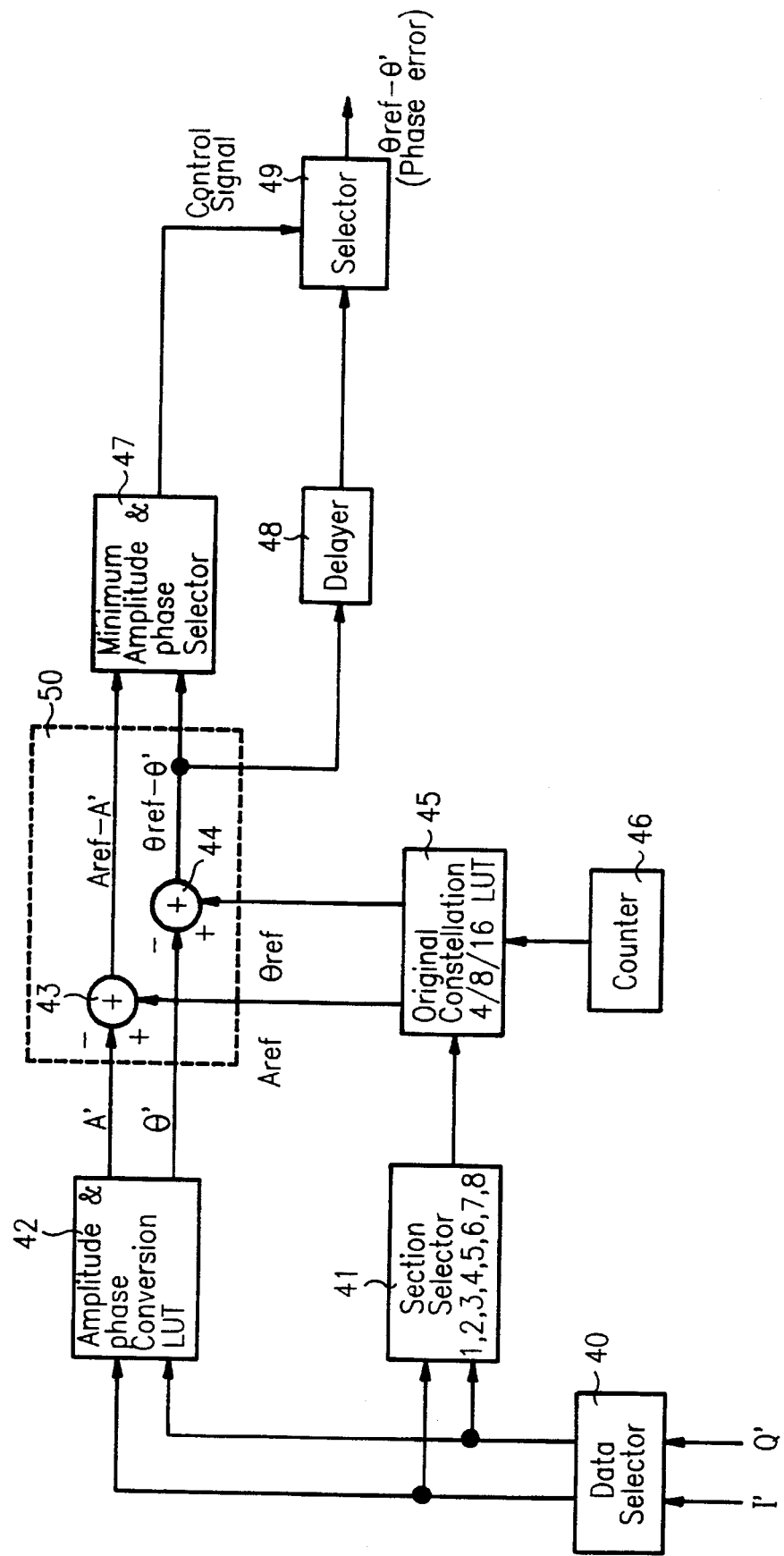
FIG. 7 is a system detail of a first embodiment of the phase error detector of FIG. 5.

Referring to FIG. 7, a system detail of a first embodiment of the phase error detector 17 of FIG. 5 is to be explained hereinafter.

As shown in FIG. 7, the first embodiment of the phase error detector 17 includes a data selector 40 for selecting the corrected I value I' and the corrected Q value Q' within a desired particular section from the corrected I value I' and the corrected Q value Q' received from the complex demultiplexer 18, a section selector 41 for selecting the section where the corrected I value I' and the corrected Q value Q' within a particular section received from the data selector 40 are positioned, an amplitude and phase conversion LUT 42 for converting the corrected I value I' and the corrected Q value Q' within a particular section received from the data selector 40 into an amplitude A' and a phase θ' respectively, an original constellation 4/8/16 LUT 45 for producing reference amplitudes Aref and reference phases θref for lattice points of the I axis and the Q axis according to the section selected at the section selector 41, a counter 46 for applying a counted value to the original constellation 4/8/16 LUT 45, an error computing part 50 for subtracting the amplitude A' and the phase θ' received from the amplitude and phase conversion LUT 42 from the reference amplitude Aref and the reference phase θref received from the original constellation 4/8/16 LUT 45 respectively into amplitude and phase errors Aref-A' and θref-θ', a minimum amplitude and phase selector 47 for selecting the minimum amplitude and phase errors Aref-A' and θref-θ' from the amplitude and phase errors Aref-A' and θref-θ' for producing a control signal, a delayer 48 for delaying the phase errors θref-θ' received from the error computing part 50, and a selector 49 for applying a phase error θref-θ' corresponding to the selected amplitude and phase errors Aref-A' and θref-θ' of the phase errors θref-θ' having delayed at the delayer 48 received from the error computing part 50 in response to the control signal received from the minimum amplitude and phase selector 47.

Herein, the section selector 41 selects a section from 8 sections wherein the corrected I value I' and the corrected Q value Q' within the particular section received from the data selector 40 are positioned.

The original constellation 4/8/16 LUT 45 produces reference amplitudes Aref and reference phases θref of the lattice points of I axis and Q axis for 4 levels, 8 levels, 16 levels, and 2 levels only for vertical reference sections.

The error computing part 50 includes a subtracter 43 for subtracting the amplitude A' received from the amplitude and phase conversion LUT 42 from the reference amplitude Aref received from the original constellation 4/8/16 LUT 45 into an amplitude difference Aref-A' and applying the amplitude difference Aref-A' to the minimum amplitude and phase selector 47, and a subtracter 44 for subtracting the phase θ' received from the amplitude and phase conversion LUT 42 from the reference phase θref received from the original constellation 4/8/16 LUT 45 into a phase difference θref-θ' and applying the phase difference θref-θ' to the minimum amplitude and phase selector 47.

Operation of the first embodiment of the phase error detector 17 having the foregoing system is to be explained hereinafter in detail, referring to FIGS. 8 and 9.

Figure 9:
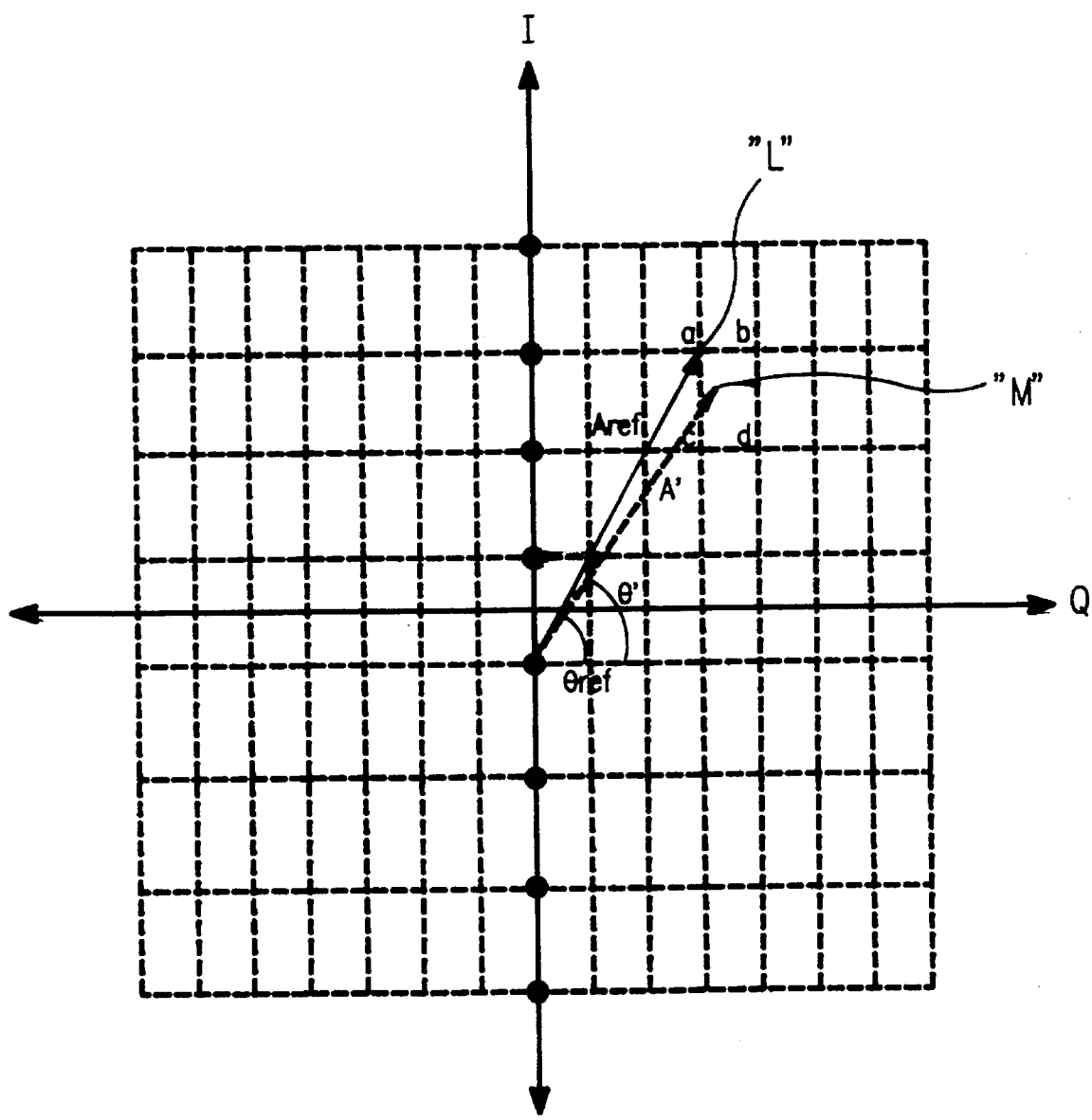
FIG. 9 is a graph explaining the operation of the phase error detector of FIG. 7.

Of the 8 level data shown in FIG. 9, I axis data is actual data, and Q axis data is data having Hilbert transform filtered.

Herein, if original data "L" is distorted into data "M" due to a phase error caused by the local oscillator of the tuner etc., a difference of phase θref-θ' between a reference phase θref, an angle of the original data "L" and a phase θ', an angle of the received data "M" having a phase error occurred, is an angular error, i.e., a phase error due to phase noise.

One lattice point of the lattice points around the received data "M" i.e., of lattice points of a, b, c, and d, having the least differences for both in amplitudes between the reference amplitudes Are, and the amplitude A' of the received data "M" and in phases between the reference phases θref and the phase θ' of the received data "M", i.e., in the phase error θref-θ' is searched.

Taking this lattice point as the original position of the received data "M", the phase error θref-θ' at the point is obtained and applied to the loop filter 16.

Processes for detecting the foregoing phase error is to be explained hereinafter, again, referring to FIG. 7.

The corrected I value I' and the corrected Q value Q' received from the complex demultiplexer 18 are taken of the corrected I value I' and the corrected Q value Q' within a desired particular section at the data selector 40.

That is, in order to make a phase error detection easy, the corrected I value I' and the corrected Q value Q' received from the complex demultiplexer 18 can be taken of all of the section, or of a desired particular section, or of a vertical synchronization section from the transmission format of the HDTV system of the Grand Alliance.

The corrected I value I' and the corrected Q value Q' within a particular section received from the data selector 40 are converted into an amplitude A' and a phase θ' through the amplitude and phase conversion LUT 42.

Figure 8:
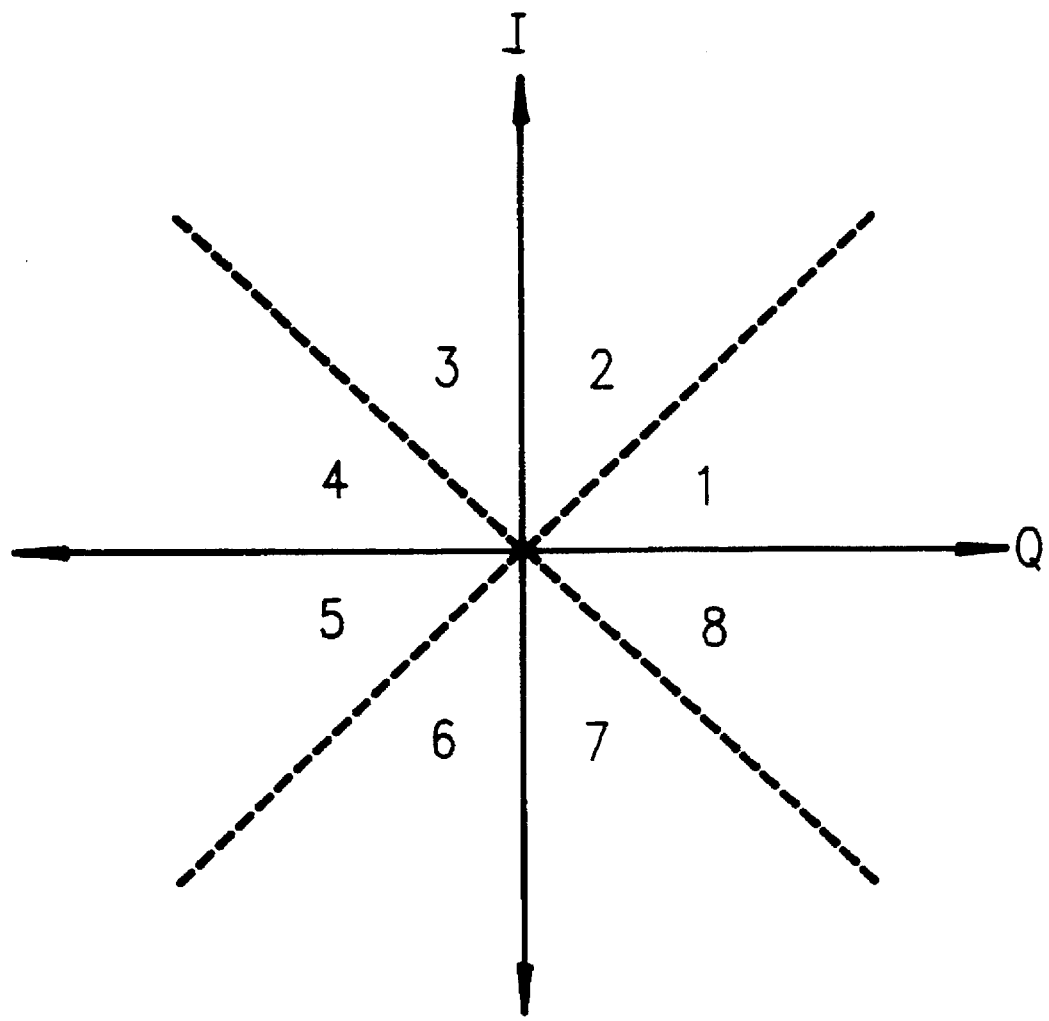
FIG. 8 is a graph explaining the operation of the section selector of FIG. 7.

Meantime, of the octants of 1, 2, 3, 4, 5, 6, 7, and 8 shown in FIG. 8, with determination of an octant on which the corrected I value I' and the corrected Q value Q' within a particular section received from the data selector 40 falls at the section selector 41, with the phase of the corrected I value I' and the corrected Q value Q' confined within 45 deg., the amount of computation can be reduced.

As shown in FIG. 9, the original constellation 4/8/16 LUT 45 produces reference amplitudes Aref and reference phases θref for the lattice points of I axis and Q axis for the section selected at the section selector 41 by the counted value received from the counter 46.

That is, the original constellation 4/8/16 LUT 45 can either selectively produce the reference amplitudes Aref and the reference phases θref for the lattice points in 4 level, 8 level, 16 level values, or can produce them in phase 2 level values only for a vertical reference section.

The reference amplitudes Aref and the reference phases θref received from the original constellation 4/8/16 LUT 45 are subtracted by the amplitude A' and the phase θ' received from the amplitude and phase conversion LUT 42 at the error computing part 50 into amplitude and phase errors Aref-A' and θref-θ'.

That is, the reference amplitude Aref, received from the original constellation 4/8/16 LUT 45, subtracted by the amplitude A' received from the amplitude and phase conversion LUT 42 at the error computing part 50 into an amplitude difference Aref-A', is applied to the minimum amplitude and phase selector 47, and the reference phase θref, received from the original constellation 4/8/16 LUT 45, subtracted by the phase θ' received from the amplitude and phase conversion LUT 42 at the error computing part 50 into a phase difference θref-θ', is applied to the minimum amplitude and phase selector 47.

Of the amplitude and phase errors Aref-A' and θref-θ' applied from the error computing part 50 to the minimum amplitude and phase selector 47, the minimum amplitude and phase errors Aref-A' and θref-θ' are selected at the minimum amplitude and phase selector 47 for respective control signals.

That is, as shown in FIG. 9, the minimum amplitude and phase selector 47 selects one lattice point that has the smallest amplitude and phase errors Aref-A' and θref-θ' from lattice points of a, b, c, and d.

Of the phase errors θref-θ' received from the error computing part 50 after being delayed at the delayer 48, the selector 49 selects a phase error θref-θ' corresponding to the selected amplitude and phase errors Aref-A' and θref-θ', and applies the selected phase error θref-θ' to the loop filter 16.

That is, upon having one of the lattice points a, b, c, and d selected, the selector 49 selects the corresponding phase error θref-θ', and applies it to the loop filter 16.

Herein, the delayer 48 delays the phase errors θref-θ' received from the error computing part 50 for the time period that the minimum amplitude and phase selector 47 selects one lattice point that has the smallest amplitude and phase errors Aref-A' and θref-θ' from lattice points of a, b, c, and d, and applies it to the selector 49.

A system detail of a second embodiment of the phase error detector 17 of FIG. 5 is to be explained hereinafter, referring to FIG. 10.

Figure 10:
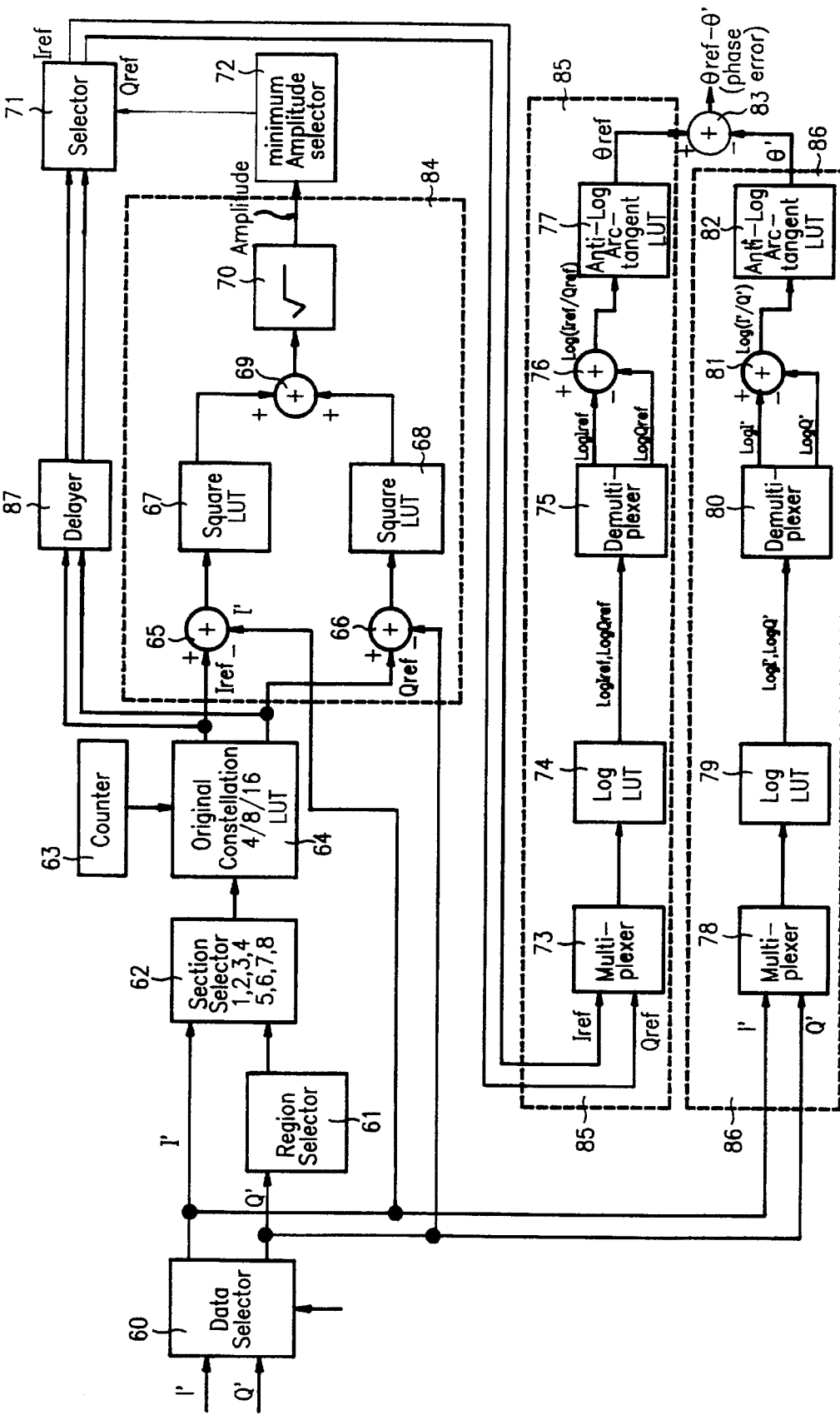
FIG. 10 is a system detail of a second embodiment of the phase error detector of FIG. 5.

As shown in FIG. 10, the second embodiment of the phase error detector 17 includes a data selector 60 for selecting corrected I values I' and corrected Q values Q' within a particular section from the corrected I values I' and the corrected Q values Q' received from the complex demultiplexer 18, a region selector 61 for selecting the region having the corrected Q value Q' received from the data selector 60, a section selector 62 for selecting the section having the corrected I value I' within a particular section received from the data selector 60 positioned according to the region selected at the region selector 61, an original constellation 4/8/16 LUT 64 for producing reference I values Iref and reference Q values Qref for lattice points of an I axis and a Q axis according to the section selected at the section selector 62, a counter 63 for applying counted value to the original constellation 4/8/16 LUT 64, a delayer 87 for delaying the reference I values Iref and the reference Q values Qref received from the original constellation 4/8/16 LUT 64, an amplitude computing part 84 for computing amplitudes of the reference I values Iref and the reference Q values Qref received from the original constellation 4/8/16 LUT 64 and the corrected I value I' and the corrected Q value Q' received from the data selector 60, a minimum amplitude selector 72 for selecting the smallest amplitude from the amplitudes received from the amplitude computing part 84 for a control signal, a selector 71 for selecting a reference I value Iref and a reference Q value Qref corresponding to the selected amplitude from the reference I values Iref and the reference Q values Qref received from the original constellation 4/8/16 LUT 64 through the delayer 87 in response to the control signal received from the minimum amplitude selector 72, a reference phase computing part 85 for computing a reference phase θref using a reference I Iref and a reference Q value Qref received from the selector 71, a phase computing part 86 for computing a phase θ' using the corrected I value I' and the corrected Q value Q' within a particular section received from the data selector 60, and a subtracter 83 for subtracting the phase θ' received from the phase computing part 86 from the reference phase θref received from the reference phase computing part 85 into a phase error θref-θ' for applying to the loop filter 16.

Herein, the section selector 62 selects a section where the corrected I value I' within a particular section received from data selector 60 is positioned according to the section selected at the region selector 61.

And, the original constellation 4/8/16 LUT 64 produces reference I values Iref and reference Q values Qref for lattice points of the I axis and the Q axis for 4 levels, 8 levels, 16 levels, and 2 levels only for vertical sections.

And, the amplitude computing part 84 includes a subtracter 65 for subtracting the corrected I value I' received from the data selector 60 from the reference I value Iref received from the original constellation 4/8/16 LUT 64, a subtracter 66 for subtracting the corrected Q value Q' received from the data selector 60 from the reference Q value Qref received from the original constellation 4/8/16 LUT 64, a square LUT 67 for squaring the value received from the subtracter 65, a square LUT 68 for squaring the value received from the subtracter 66, an adder 69 for adding the values received from the square LUTs 67 and 68 together, and a square root LUT 70 for producing square root of the value received from the adder 69 and applying it to the minimum amplitude selector 72.

The reference phase computing part 85 includes a multiplexer 73 for multiplexing the reference I value Iref and the reference Q value Qref received from the selector 71, a log LUT 74 for producing a logarithmic reference I value logIref and a logarithmic reference Q value logQref of the values received from the multiplexer 73, a demultiplexer 75 for demultiplexing the logarithmic reference I value logIref and the logarithmic reference Q value logQref received from the log LUT 74, a subtracter 76 for subtracting the logarithmic reference Q value logQref from the logarithmic reference I value logIref received from the demultiplexer 75, and an anti-log arc-tangent LUT 77 for producing an anti-log arc-tangent of the value received from the subtracter 76 into a reference phase θref and applying the reference phase θref to the subtracter 83.

The phase computing part 86 includes a multiplexer 78 for multiplexing the corrected I value I' and the corrected Q value Q' within a particular section received from the data selector 60, a log LUT 79 for producing logarithmic values of the values received from the multiplexer 78 into a logarithmic corrected I value logI' and a logarithmic corrected Q value logQ', a demultiplexer 80 for demultiplexing the logarithmic corrected I value logI' and the logarithmic corrected Q value logQ' received from the log LUT 74, a subtracter 81 for subtracting the logarithmic corrected Q value logQ' from the logarithmic corrected I value logI' received from the demultiplexer 80, and an anti-log arc-tangent LUT 82 for producing an anti-log arc-tangent of the value received from the subtracter 81 into a phase θ' and applying the phase θ' to the subtracter 83.

Operation of the second embodiment of the phase error detector 17 having the foregoing system is to be explained hereinafter in detail, referring to FIGS. 11a and 11b.

Figure 11A:
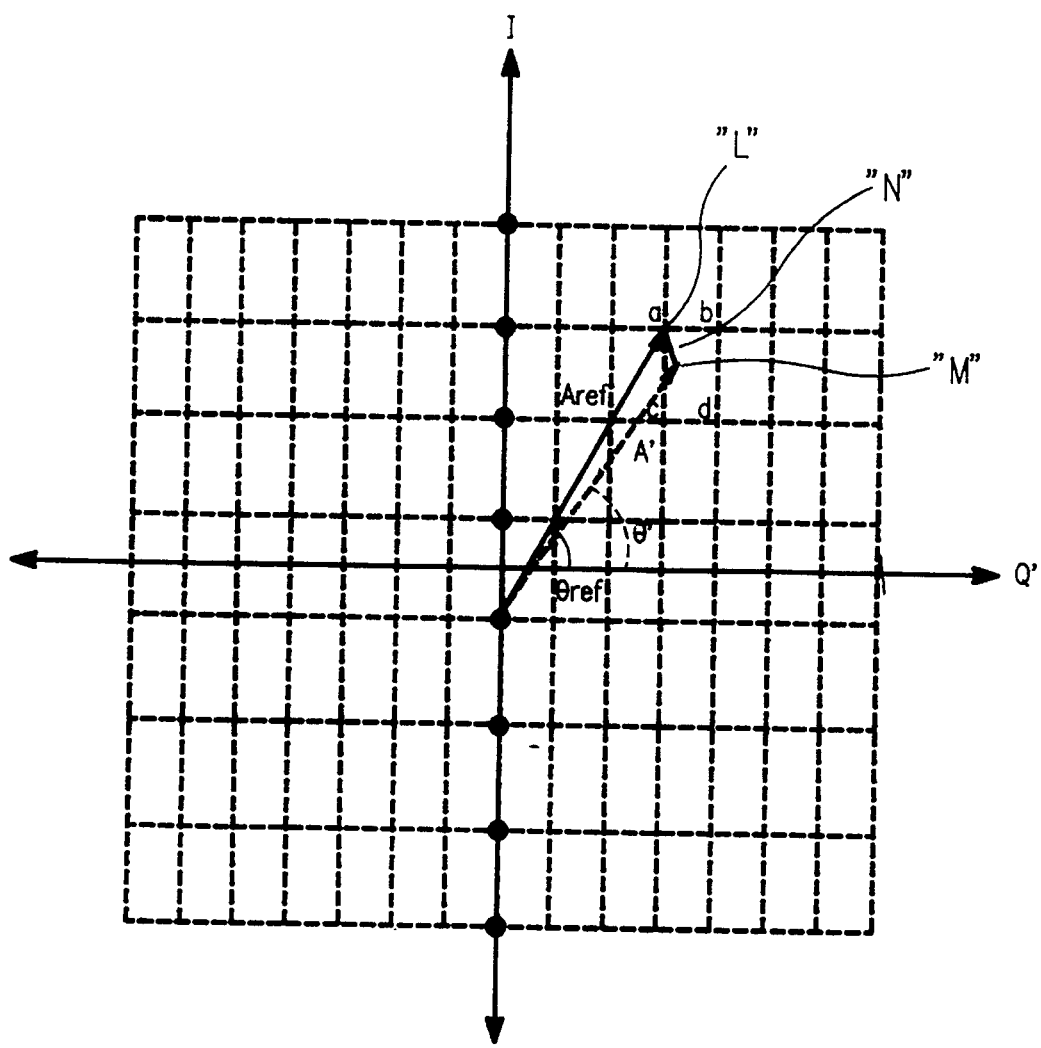
FIGS. 11a and 11b are graphs explaining the operation of the phase error detector of FIG. 10.
Figure 11B:
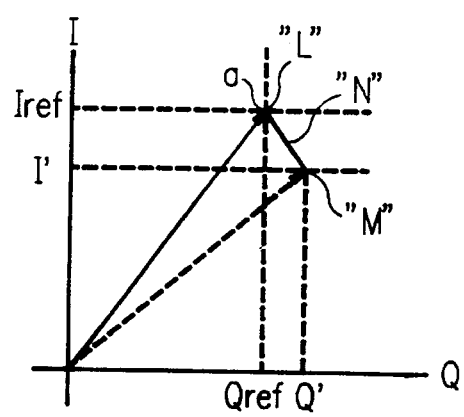

FIG. 11a is for 8 level data and FIG. 11b is for a data level error for a phase error.

As shown in FIGS. 11a and 11b, of the lattice points of a, b, c, and d, it is intended to take a lattice point nearest to a received data "M" as an original position of the data.

As shown in FIG. 11b, distances "N" between a position of the received data "M" and positions of the lattice points "L" for all the surrounding lattice points a, b, c, and d are obtained, of which an "N" a lattice point having the smallest "N" i.e., the nearest lattice point to the "M" is taken as a reference point of the received data "M". Taking an angle between the two lines, i.e., a phase error θref-θ' as the phase error, this value is applied to the loop filter 16.

Such a process for detecting a phase error is to be explained hereinafter again, referring to FIGS. 10, 11a and 11b.

The corrected I value I' and the corrected Q value Q' received from the complex demultiplexer 18 is selected of the corrected I value I' and the corrected Q value Q' within a particular section at the data selector 60.

That is, in order to make the detection of a phase error easy, the corrected I value I' and the corrected Q value Q' received from the complex demultiplexer 18 may be selected, at the data selector 60, of all the section, or of within a desired particular section, or of a vertical synchronization section from the transmission format of the HDTV system of the Grand Alliance.

In the meantime, the corrected I value I' and the corrected Q value Q' applied from the data selector 60, is determined of the position within one of the octants of 1, 2, 3, 4, 5, 6, 7, and 8 shown in FIG. 8 through the region selector 61 and the section selector 62, for limiting the phase angle formed by the corrected I value I' and the corrected Q value Q' within 45 deg. that helps reduce an amount of computation.

That is, the corrected Q value Q' within a particular section received from the data selector 60 is selected of the disposed region at the region selector 61, and the corrected I value I' within a particular section received from the data selector 60 is selected of the disposed section at the section selector 62 according to the region selected at the region selector 61.

As shown in FIGS. 11a and 11b, the original constellation 4/8/16 LUT 64 produces reference I values Iref and reference Q values Qref for the lattice points of I axis and Q axis according to the sections selected at the section selector 62 by the count value received from the counter 63.

That is, the original constellation 4/8/16 LUT 64 can produce the reference I values Iref and the reference Q values Qref either in 4 levels, 8 levels, 16 levels selectively, or 2 levels only for vertical reference sections.

In other words, as shown in FIGS. 11a and 11b, the original constellation 4/8/16 LUT 64 can inform positions of the lattice points either for 4 levels, 8 levels, and 16 levels, or for 2 levels when only the vertical reference sections are formed according to the sections selected at the section selector 62 by the count value received from the counter 63.

Amplitudes of the reference I values Iref and the reference Q values Qref applied from the original constellation 4/8/16 LUT 64 are computed at the amplitude computing part 84 according to the corrected I values I' and the corrected Q values Q' applied from the data selector 60.

That is, the reference I value Iref, applied from the original constellation 4/8/16 LUT 64, subtracted of the corrected I value I' applied from the data selector 60 at the subtracter 65, and the reference Q value Qref, applied from the original constellation 4/8/16 LUT 64, subtracted of the corrected Q value Q' applied from the data selector 60 at the subtracter 66, are squared at the square LUTs 67 and 68, respectively. The values $(Iref-I')^2$ and $(Qref-Q')^2$ applied from the square LUTs 67 and 68 respectively are, added at the adder 69 together into $(Iref-I')^2+(Qref-Q')^2$, and produced into a square root at the square root LUT 70 into $\sqrt{(Iref-I')^2+(Qref-Q')^2}$, and applied to the minimum amplitude selector 72.

Herein, as shown in FIG. 11b, the subtracted value Iref-I' done at the subtracter 65 corresponds to a difference of values of the lattice point data "L" and the received data "M" each projected normal to I axis, and as shown in FIG. 11b, the subtracted value Qref-Q' done at the subtracter 66 corresponds to a difference of values of the lattice point data "L" and the received data "M" each projected normal to Q axis. And, $\sqrt{(Iref-I')^2+(Qref-Q_r)^2}$ received from the square root LUT 70 corresponds to a distance "N" between the position of the lattice point data "L" and the position of the received data "M".

During the reference I values Iref and the reference Q values Qref received from the original constellation 4/8/16 LUT 64 are computed of the amplitudes at the amplitude computing part 84 according to the corrected I values I' and the corrected Q values Q' received from the data selector 60, the delayer 87 delays the reference I values Iref and the reference Q values Qref and applies the delayed the reference I values Iref and the reference Q values Qref to the selector 71.

The minimum amplitude selector 72 selects the smallest amplitude of the amplitudes received from the square root LUT 70 of the amplitude computing part 84, and produces a control signal corresponding to the smallest amplitude.

That is, as shown in FIG. 11a, the square root $\sqrt{(Iref-I')^2+(Qref-Q')^2}$ applied from the amplitude computing part 84 to the minimum amplitude selector 72 is used for selection of a lattice point having the smallest "N" value of the "N" values from the position of the received data "M" to the lattice points of a, b, c, and d.

In this time, the selector 71 applies the reference I value Iref and the reference Q value Qref corresponding to the position of the lattice point selected at the minimum amplitude selector 72.

The reference I value Iref and the reference Q value Qref received from the selector 71 is used for computing a reference phase θref at the reference phase computing part 85.

That is, the reference I value Iref and the reference Q value Qref received from the selector 71 are, multiplexed at the multiplexer 73, taken of the logarithmic value at the log LUT 74, demultiplexed at the demultiplexer 75 into a logarithmic reference I value logIref and a logarithmic reference Q value logQref. The logarithmic reference I value logIref received from the demultiplexer 75 is subtracted of the logarithmic reference Q value logQref at the subtracter 76 into a logIref/Qref, and produced into an anti-log arc-tangent value at the anti-log arc-tangent LUT 77 to a reference phase θref as formed at the original lattice point "L" as shown in FIG. 11a.

And, the corrected I value I' and the corrected Q value Q' received from the data selector 60 are used for computing a phase θ' at the phase computing part 86.

That is, the corrected I value I' and the corrected Q value Q' received from the data selector 60 are, multiplexed at the multiplexer 78, taken of the logarithmic value at the log LUT 79, demultiplexed at the demultiplexer 80 into a logarithmic corrected I value logI' and a logarithmic corrected Q value logQ'. The logarithmic corrected I value logI' received from the demultiplexer 80 is subtracted of the logarithmic corrected Q value logQ' at the subtracter 81 into a logI'/Q', and produced into an anti-log arc-tangent value at the anti-log arc-tangent LUT 82 to a phase θ' as formed by the received data "M" as shown in FIG. 11a.

The reference phase θref received from the anti-log arc-tangent LUT 77 of the reference phase computing part 85 is subtracted of the phase θ' received from the anti-log arc-tangent LUT 82 of the phase computing part 86 at the subtracter 83 into a phase error θref-θ', and applied to the loop filter 16.

Herein, as shown in FIG. 11a, the phase error θref-θ' corresponds to a differential angle formed by the position "L" of the original lattice point and the received data "M" having phase noise.

As other embodiment of the phase error corrector in accordance with this invention, if the Hilbert transform filter 12 is removed, and a Q value applied from the equalizer 5 is used as the Q value of this time, it is applicable to a QAM system, of which Q value applied from the equalizer 5 in this time is required to be passed through the gain/offset adjustment unit 11.

That is, another embodiment of the phase error corrector in accordance with this invention includes a gain/offset adjustment unit 11 for adjusting a gain and an offset of a received I data and Q data, a log LUT 14 for producing logarithmic values of the I data and Q data received from the gain/offset adjustment unit 11 into a logI value and a logQ value, a complex demultiplexer 18 for producing a corrected I value I' and a corrected Q value Q' out of the logI value and the logQ value received from the log LUT 14, a phase error detector 17 for detecting a phase error from the corrected I value I' and the corrected Q value Q' received from the complex demultiplexer 18, and a loop filter 16 for accumulating the phase errors received from the phase error detector 17 and applying them to the complex demultiplexer 18.

And, in this case, the original constellation 4/8/16 LUT 45 of the first embodiment of the phase error detector produces reference amplitudes Aref and reference phases θref for the lattice points of I axis and Q axis according to sections selected at the section selector to suit to 16QAM, 32QAM, 62QAM, and 256QAM.

That is, the original constellation 4/8/16 LUT 45 produces reference amplitudes Aref and reference phases θref for the-lattice points of I axis and Q axis according to sections selected at a section selector to suit to the QAM systems of 16QAM, 32QAM, 62QAM, and 256QAM.

And, in this case, the original constellation 4/8/16 LUT 64 of the second embodiment of the phase error detector produces reference I value Iref and reference Q value Qref for the lattice points of I axis and Q axis according to sections selected at the section selector to suit to 16QAM, 32QAM, 62QAM, and 256QAM.

That is, the original constellation 4/8/16 LUT 64 produces reference amplitudes Aref and reference phases θref for the lattice points of I axis and Q axis according to sections selected at the section selector to suit to the QAM systems of 16QAM, 32QAM, 62QAM, and 256QAM.

As has been explained, this invention is advantageous in that it can reduce slice errors caused by phase noise coming from local oscillator used in a tuner by correcting phase errors, and can be applicable not only to an HDTV but also a QAM for correcting phase errors in an 8 VSB system.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A phase error corrector for an HDTV reception system comprising:

a gain and offset adjustment unit for adjusting a gain and an offset of incoming I data;

a Hilbert transform filter for performing a Hilbert transform filtering of the I data received from the gain and offset adjustment unit for generating Q data;

a log LUT for producing logarithmic values of the I data and the Q data received from the gain and offset adjustment unit and the Hilbert transform filter into logI value and logQ value respectively;

a complex demultiplexer for generating a corrected I value and a corrected Q value having their errors corrected out of the logI value and the logQ value received from the log LUT;

a phase error detector for detecting phase errors from the corrected I value and the corrected Q value received from the complex demultiplexer; and, a loop filter for accumulating phase errors received from the phase error detector and applying the accumulated phase errors to the complex demultiplexer.

2. The phase error corrector as claimed in claim 1, further comprising, a multiplexer for multiplexing the I data and the Q data received from the gain and offset adjustment unit and the Hilbert transform filter respectively and applying them to the log LUT, and a demultiplexer for demultiplexing the logI value and the logQ value received from the log LUT and applying them to the complex demultiplexer.

3. The phase error corrector as claimed in claim 1, wherein the complex demultiplexer includes, a logcosθ LUT for producing a logarithmic cosine of the phase error θ received from the loop filter into logcosθ, a logsinθ LUT for producing a logarithmic sine of the phase error θ received from the loop filter into logsinθ, an adding part for adding the logI value and the logQ value received from the log LUT to the logcosθ and the logsinθ received from the logcosθ LUT and the logsinθ LUT respectively, a multiplexer for multiplexing the data received from the adding part, an anti-log LUT for producing an anti-logarithmic value for each of the data values received from the multiplexer, a demultiplexer for demultiplexing the data values received from the anti-log LUT, and a computing part for subtracting and adding the data values received from the demultiplexer for producing a phase error corrected I value and a phase error corrected Q value.

4. The phase error corrector as claimed in claim 3, wherein the adding part includes, a first adder for adding the logI value received from the log LUT and the logcosθ received from the logcosθ LUT, a second adder for adding the logI value received from the log LUT and the logsinθ received from the logsinθ LUT, a third adder for adding the logQ value received from the log LUT and the logcosθ received from the logcosθ LUT, and a fourth adder for adding the logQ value received from the log LUT and the logsinθ received from the logsinθ LUT.

5. The phase error corrector as claimed in claim 3, wherein the computing part includes, a subtracter for subtracting Qsinθ from Icosθ received from the demultiplexer for producing a phase error corrected I value, and an adder for adding Qcosθ to Isinθ received from the demultiplexer for producing a phase error corrected Q value.

6. The phase error corrector as claimed in claim 1, wherein the phase error detector includes, a data selector for selecting the corrected I value and the corrected Q value within a desired particular section from the corrected I value and the corrected Q value received from the complex demultiplexer, a section selector for selecting the section where the corrected I value and the corrected Q value within a particular section received from the data selector are positioned, an amplitude and phase conversion LUT for converting the corrected I value and the corrected Q value within a particular section received from the data selector into an amplitude and a phase respectively, an original constellation 4/8/16 LUT for producing reference amplitudes and reference phases for lattice points of an I axis and a Q axis according to the section selected at the section selector, an error computing part for subtracting the amplitude and the phase received from the amplitude and phase conversion LUT from the reference amplitude and the reference phase received from the original constellation 4/8/16 LUT respectively into amplitude and phase errors, a minimum amplitude and phase selector for selecting the minimum amplitude and phase errors from the amplitude and phase errors for producing a control signal, and a selector for applying a phase error corresponding to the selected amplitude and phase errors of the phase errors received from the error computing part in response to the control signal received from the minimum amplitude and phase selector.

7. The phase error corrector as claimed in claim 6, wherein the section selector selects a section from eight equal divided sections, where the corrected I value and the corrected Q value within the particular section received from the data selector are positioned.

8. The phase error corrector as claimed in claim 6, wherein the phase error detector further includes a counter for applying a counted value to the original constellation 4/8/16 LUT.

9. The phase error corrector as claimed in claim 6, wherein the original constellation 4/8/16 LUT produces reference amplitudes and reference phases for the lattice points of an I axis and a Q axis for 4 levels, 8 levels, 16 levels, and 2 levels only for vertical reference sections.

10. The phase error corrector as claimed in claim 6, wherein the error computing part includes, a first subtracter for subtracting the amplitude received from the amplitude and phase conversion LUT from the reference amplitude received from the original constellation 4/8/16 LUT into an amplitude difference and applying the amplitude difference to the minimum amplitude and phase selector, and a second subtracter for subtracting the phase received from the amplitude and phase conversion LUT from the reference phase received from the original constellation 4/8/16 LUT into a phase difference and applying the phase difference to the minimum amplitude and phase selector.

11. The phase error corrector as claimed in claim 6, further including a delayer for delaying the phase errors received from the error computing part and applying the delayed phase errors to the selector.

12. The phase error corrector as claimed in claim 1, wherein the phase error detector includes, a data selector for selecting corrected I values and corrected Q values within a particular section from the corrected I values and the corrected Q values received from the complex demultiplexer, a region selector for selecting the region where the corrected Q value received from the data selector is positioned, a section selector for selecting the section where the corrected I value within a particular section received from the data selector is positioned according to the region selected at the region selector, an original constellation 4/8/16 LUT for producing reference I values and reference Q values for lattice points of an I axis and a Q axis according to the section selected at the section selector, an amplitude computing part for computing amplitudes of the reference I values and the reference Q values received from the original constellation 4/8/16 LUT and the corrected I value and the corrected Q value received from the data selector, a minimum amplitude selector for selecting the smallest amplitude from the amplitudes received from the amplitude computing part for a control signal, a selector for selecting a reference I value and a reference Q value corresponding to the selected amplitude from the reference I values and the reference Q values received from the original constellation 4/8/16 LUT in response to the control signal received from the minimum amplitude selector, a reference phase computing part for computing a reference phase using a reference I value and a reference Q value received from the selector, a phase computing part for computing a phase using the corrected I value and the corrected Q value within a particular section received from the data selector, and a first subtracter for subtracting the phase received from the phase computing part from the reference phase received from the reference phase computing part into a phase error for applying to the loop filter.

13. The phase error corrector as claimed in claim 12, wherein the section selector selects a section where the corrected I value within a particular section received from data selector is positioned according to the section selected at the region selector.

14. The phase error corrector as claimed in claim 12, wherein the phase error detector further includes a counter for applying counted value to the original constellation 4/8/16 LUT.

15. The phase error corrector as claimed in claim 12, wherein the original constellation 4/8/16 LUT produces reference I values and reference Q values for lattice points of the I axis and the Q axis for 4 levels, 8 levels, 16 levels, and 2 levels only for vertical sections.

16. The phase error corrector as claimed in claim 12, wherein the phase error detector further includes a delayer for delaying the reference I values and the reference Q values received from the original constellation 4/8/16 LUT and applying them to the selector.

17. The phase error corrector as claimed in claim 12, wherein the amplitude computing part includes, a second subtracter for subtracting the corrected I value received from the data selector from the reference I value received from the original constellation 4/8/16 LUT, a third subtracter for subtracting the corrected Q value received from the data selector from the reference Q value received from the original constellation 4/8/16 LUT, a first square LUT for squaring the value received from the second subtracter, a second square LUT for squaring the value received from the third subtracter, an adder for adding the values received from the first, and the second square LUTs together, and a square root LUT for producing square root of the value received from the adder and applying it to the minimum amplitude selector.

18. The phase error corrector as claimed in claim 12, wherein the reference phase computing part includes, a multiplexer for multiplexing the reference I value and the reference Q value received from the selector, a log LUT for producing a logarithmic reference I value and a logarithmic reference Q value of the values received from the multiplexer, a demultiplexer for demultiplexing the logarithmic reference I value and the logarithmic reference Q value received from the log LUT, a second subtracter for subtracting the logarithmic reference Q value from the logarithmic reference I value received from the demultiplexer, and an anti-log arc-tangent LUT for producing an anti-log arc-tangent of the value received from the second subtracter into a reference phase and applying the reference phase to the first subtracter.

19. The phase error corrector as claimed in claim 12, wherein the phase computing part includes, a multiplexer for multiplexing the corrected I value and the corrected Q value within a particular section received from the data selector, a log LUT for producing logarithmic values of the values received from the multiplexer into a logarithmic corrected I value and a logarithmic corrected Q value, a demultiplexer for demultiplexing the logarithmic corrected I value and the logarithmic corrected Q value received from the log LUT, a second subtracter for subtracting the logarithmic corrected Q value from the logarithmic corrected I value received from the demultiplexer, and an anti-log arc-tangent LUT for producing an anti-log arc-tangent value of the value received from the second subtracter into a phase and applying the phase to the first subtracter.

20. The phase error corrector as claimed in claim 6, wherein the original constellation 4/8/16 LUT produces reference amplitudes and reference phases for the lattice points of the I axis and the Q axis according to sections selected at the section selector to suit to 16QAM, 32QAM, 62QAM, and 256QAM.

21. The phase error corrector as claimed in claim 12, wherein the original constellation 4/8/16 LUT produces the reference I value and the reference Q value for the lattice points of the I axis and Q axis according to sections selected at the section selector to suit to 16QAM, 32QAM, 62QAM, and 256QAM.

* * * * *